Patented Oct. 26, 1943

2,332,939

UNITED STATES PATENT OFFICE 2,332,939

STABILIZED WATER-IN-OIL-EMULSIONS

Hilger Peter Schmitz and Hermann Unterguggenberger, Munich, Germany; vested in the Alien Property Custodian No Drawing. Application April 16, 1940, Serial No. 329,860. In Germany January 6, 1939

13 Claims. (Cl. 260—29)

This invention relates to a method of stabilizing emulsions of substances of high molecular weight. More particularly, it relates to stabilizing emulsions of resins against storage and transport conditions.

Emulsions, and particularly water-in-oil type emulsions of resins, such as, for example, alkyd resins, urea formaldehyde resins, etc., have come into general use because it has been found that the emulsified materials are capable of a wider range of uses than is possible using the same materials in solid form. However, these emulsions are frequently injured by low temperature during shipment or storing. When such emulsions are frozen and then melted again, they do not yield the original emulsion, but the structure is altered to a certain extent, and this cannot always be corrected by stirring or other forms of mixing.

It is an object of this invention to improve the stability of emulsions of materials of high molecular weight. Another object of this invention is to improve the stability of water-in-oil type of emulsions containing resins, natural or synthetic, during storage and shipment. A further object is to improve the stability of such emulsions against breaking by freezing. Another object is to improve the body and flowing characteristics of such emulsions. Other objects will appear hereinafter.

These objects are accomplished by the discovery that emulsions of materials of high molecular weight may be stabilized against conditions of storage and shipment, and particularly against low temperatures by the addition of neutral salts. The neutral salts also improve the body and flowing characteristics.

In order that the invention may be more fully understood, the following examples are set forth wherein Example I illustrates the prior art, and Example II illustrates the present invention.

Example I

A castor oil modified glycerol phthalate resin was prepared by heating a mixture of

| | Parts |
|---|---|
| Castor oil | 155.9 |
| 98 per cent glycerol | 117.0 |
| Phthalic anhydride | 204.6 | under agitation at 200° C. until a test portion showed an acid number of approximately thirteen, which required about six hours of heating at 200° C. For storage purposes, the resulting resin was then cooled and diluted with an equal weight of xylene.

| | Parts |
|---|---|
| Dilute resin as made above | 50 |
| Octyl alcohol | 15 |
| Xylene | 40 | were mixed to form a homogenous solution. To this solution was added, under vigorous stirring, a suspension, in water, of colloidal clay, of a particle size of 5 microns or less, the suspension consisting of

| | Parts |
|---|---|
| Colloidal clay (dry basis) | 2.4 |
| Water | 167.6 |

The resulting water-in-oil emulsion showed comparatively poor flowing properties, i. e., the emulsion did not flow down a glass rod in a continuous stream, but divided into relatively large aggregates.

A 25-gram sample of the above emulsion was placed in a test tube of 1-inch diameter and immersed for 15 minutes in a freezing bath consisting of solid carbon dioxide and acetone which cooled the sample to about —50° C. (50° below freezing) whereby the aqueous phase was frozen completely. The sample was removed from the freezing bath and allowed to warm to room temperature without stirring. The emulsion exhibited a curdy appearance and some clear liquid separated out and formed a layer at the bottom of the test tube.

Example II

A second emulsion was made by preparing a resin solution of exactly the same composition as used in Example I. To this solution was added, under vigorous stirring, enough of a suspension of colloidal clay in an aqueous solution of sodium chloride to produce an emulsion of substantially the same viscosity and the same total colloidal clay content. The amount of water used for this emulsification was 157.4 parts in which 10 parts of sodium chloride had been previously dissolved.

The emulsion thus produced could be poured in a continuous stream and exhibited excellent flowing properties, much superior to those of the emulsion of Example I.

A 25-gram sample of this emulsion was frozen to about —50° C. and thawed to room temperature using the same method and technique as in Example I. The salt-containing emulsion, after freezing and thawing, remained apparently unchanged and exhibited the same excellent flowing properties which it had before being subjected to freezing.

The emulsions with which this invention is concerned are emulsions containing materials of high molecular weight, insoluble in water. The preferred materials are water-insoluble, natural and synthetic resins of the film-forming type, such, for example, as shellac, gum dammar, polymeric methacrylic acid derivatives, alkyd resins, phenol-formaldehyde condensation products, urea-formaldehyde resins of the type disclosed in U. S. Patent No. 2,019,865, and mixtures of said materials.

The preferred emulsions are water-in-oil emulsions. The oil phase may be any high boiling (140° C. to 200° C.) hydrocarbon of the aliphatic or aromatic type, such, for example, as the higher fractions of petroleum and coal tar distillations. In this oil phase is dissolved, or colloidally dispersed, a water-insoluble resin of the type above described. The amount of resin present in the emulsion may, in general, vary from 1.5 per cent to 25 per cent of the total emulsion. Solvent-soluble plasticizers are preferably present, such, for example, as oil modified "glyptal" resins ("glyptal" is a trade name for alkyd resins made from phthalic anhydride and glycerine), drying oils, etc.

Any emulsifying agent may be used which is known to promote water-in-oil emulsions. Examples of these are solvent-soluble metallic soaps such as aluminum and magnesium salts of higher fatty acids, colloidal clay and those emulsifiers disclosed in U. S. Patent No. 1,603,155, patented October 12, 1926.

There may be included in the emulsions various modifying agents which improve their uses for particular purposes, such, for example, as textile treating agents, pigments, and water-insoluble, solvent-soluble waxes.

The stabilizing agents which are within the scope of this invention are water-soluble neutral salts, such, for example, as sodium chloride, potassium bromide, sodium sulfate. The preferred neutral salts are sodium and potassium halides, and especially preferred is sodium chloride. These agents are dissolved in the water phase of the emulsion. The water is, in general, present in an amount of from 20 per cent to 60 per cent of the total emulsion. Even slight amounts of the stabilizing agents have appreciable effect. In general, where only protection against freezing is desired, 0.5 per cent of the stabilizer is found to be satisfactory, although larger quantities may be used. Where improvement in the body and flowing characteristics of the emulsion is desired, the range is, in general, from 0.5 per cent to 20 per cent of neutral salt of stabilizer relative to water content, about 7 per cent of stabilizer being preferred.

The improved emulsions made according to the present invention may be used in the fabric treating art, the printing ink art, in the coating art, etc. They are characterized by improved stability at ordinary and freezing temperatures, and improved body and flowing characteristics.

It is apparent that many widely different embodiments of this invention may be made without departing from the spirit and scope thereof, and, therefore, it is not intended to be limited except as indicated in the appended claims.

We claim:

1. A water-in-oil emulsion, the oil phase comprising a high boiling hydrocarbon oil having therein an alkyd resin and the water phase having dissolved therein as a stabilizer against breaking by freezing an alkali metal halide 2. A water-in-oil emulsion, the oil phase comprising a high boiling hydrocarbon oil having therein a phthalic anhydride-glycerine condensation product and the water phase having dissolved therein sodium chloride as a stabilizer against breaking by freezing.

3. A water-in-oil emulsion, the oil phase comprising a high-boiling hydrocarbon oil having therein a water-insoluble resin of the film-forming type and the water phase containing, as a stabilizer against breaking by freezing, an alkali-metal halide.

4. A water-in-oil emulsion, the oil phase comprising a high-boiling hydrocarbon oil having therein a water-insoluble resin of the film-forming type and the water phase containing about 0.5 to 20 per cent, based on the water phase, of an alkali metal halide.

5. A water-in-oil emulsion, the oil phase comprising a high-boiling hydrocarbon oil having therein a water-insoluble resin of the film-forming type and the water phase containing about 0.5 to 20 per cent, based on the water phase, of sodium chloride.

6. A water-in-oil emulsion, the oil phase comprising a high-boiling hydrocarbon oil having therein an alkyd resin and the water phase containing about 0.5 to 20 per cent, based on the water phase, of an alkali metal halide.

7. A water-in-oil emulsion, the oil phase comprising a high-boiling hydrocarbon oil having therein a phthalic anhydride-glycerine condensation product of the film-forming type and the water phase containing about 0.5 to 20 per cent, based on the water phase, of sodium chloride.

8. A water-in-oil emulsion, the oil phase comprising a high-boiling hydrocarbon oil having therein a urea-formaldehyde resin and the water phase having dissolved therein as a stabilizer against breaking by freezing an alkali metal halide.

9. A water-in-oil emulsion, the oil phase comprising a high-boiling hydrocarbon oil having therein a urea-formaldehyde resin of the film-forming type and the water phase containing about 0.5 to 20 per cent, based on the water phase, of an alkali metal halide.

10. A water-in-oil emulsion, the oil phase comprising a high-boiling hydrocarbon oil having therein a urea-formaldehyde resin of the film-forming type and the water phase containing about 0.5 to 20 per cent, based on the water phase, of sodium chloride.

11. A water-in-oil emulsion, the oil phase comprising a high-boiling hydrocarbon oil having therein a resin comprising a polymeric methacrylic acid derivative and the water phase having dissolved therein as a stabilizer against breaking by freezing an alkali metal halide.

12. A water-in-oil emulsion, the oil phase comprising a high-boiling hydrocarbon oil having therein a resin comprising a polymeric methacrylic acid derivative of the film-forming type and the water phase containing about 0.5 to 20 per cent, based on the water phase, of an alkali metal halide.

13. A water-in-oil emulsion, the oil phase comprising a high-boiling hydrocarbon oil having therein a resin comprising a polymer methacrylic acid derivative of the film-forming type and the water phase containing about 0.5 to 20 per cent, based on the water phase, of sodium chloride.

HILGER PETER SCHMITZ.
HERMANN UNTERGUGGENBERGER.